(12) United States Patent
Minamino et al.

(10) Patent No.: US 6,657,929 B1
(45) Date of Patent: Dec. 2, 2003

(54) OPTICAL DISK RECORDING APPARATUS AND METHOD FOR RECORDING DATA ON OPTICAL DISK

(75) Inventors: Jun-ichi Minamino, Neyagawa (JP); Yukihiro Yamasaki, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/333,568

(22) Filed: Jun. 21, 1999

(30) Foreign Application Priority Data

Jun. 23, 1998 (JP) .......................................... 10-175558

(51) Int. Cl.[7] .............................................. G11B 7/00
(52) U.S. Cl. ............................... 369/44.13; 369/44.26; 369/275.4; 369/47.48
(58) Field of Search ................ 369/275.3, 53.34, 369/275.4, 47.4, 53.29, 44.13, 47.48, 53.3, 47.22, 124.07, 53.15, 44.25, 44.32

(56) References Cited

U.S. PATENT DOCUMENTS

| | | | |
|---|---|---|---|
| 5,195,076 A | | 3/1993 | Aoki ........................ 369/53.15 |
| 5,388,090 A | * | 2/1995 | Hoshino et al. .......... 369/44.34 |
| 5,495,465 A | * | 2/1996 | Arisaka .................... 369/47.48 |
| 5,508,985 A | | 4/1996 | Fairchild et al. ......... 369/47.22 |
| 5,617,392 A | * | 4/1997 | Shim ........................ 369/47.48 |
| 5,930,228 A | * | 7/1999 | Miyamoto et al. ....... 369/275.3 |
| 6,028,828 A | * | 2/2000 | Maeda ..................... 369/44.13 |
| 6,088,307 A | * | 7/2000 | Fushimi et al. .......... 369/44.13 |
| 6,097,695 A | * | 8/2000 | Kobayashi ............... 369/275.4 |
| 6,137,768 A | * | 10/2000 | Ishida et al. ............. 369/275.3 |
| 6,201,778 B1 | * | 3/2001 | Sensyu ..................... 369/53.34 |

FOREIGN PATENT DOCUMENTS

| | | |
|---|---|---|
| EP | 0 793 234 | 2/1997 |
| EP | 0 821 350 | 7/1997 |
| JP | 05144016 | 6/1993 |
| JP | 06187654 | 7/1994 |
| JP | 06-338127 | 12/1994 |

* cited by examiner

Primary Examiner—William Korzuch
Assistant Examiner—Kim-Kwok Chu
(74) Attorney, Agent, or Firm—Renner, Otto, Boisselle & Sklar

(57) ABSTRACT

The optical disk recording apparatus of this invention includes: a first detection section for detecting a ID address cycle based on a timing of detection of an ID section of an optical disk; a second detection section for detecting a wobble cycle based on a wobble clock; and a state determination section for determining a state of the wobble clock based on the ID address cycle and the wobble cycle.

14 Claims, 12 Drawing Sheets

OPTICAL DISK RECORDING APPARATUS AND METHOD FOR RECORDING DATA ON OPTICAL DISK

BACKGROUND OF THE INVENTION

1. Field of the Invention

The present invention relates to a rewritable optical disk recording apparatus and a method for recording data on a rewritable optical disk.

2. Description of the Related Art

A DVD-RAM (digital versatile disk random access memory) has sectors each composed of an ID section including four physical identifications (IDs) and a recording section which data is recorded on and/or reproduced from. FIG. 12 illustrates an exemplified format of such a DVD-RAM. In the recording section, tracks wobble in the radial direction forming sine shapes at a cycle of 186 channel clocks, so that this wobbling of tracks is observed in a push-pull tracking error signal as a wobble signal. Specifically, as shown in FIG. 2, a wobble signal is observed in the portion of a wide-band push-pull tracking error signal corresponding to the recording section.

The above wobble signal is allowed to pass through a narrow-band bandpass filter to digitize the wobble signal. The digitized signal and a signal obtained by dividing an oscillating frequency of a voltage controlled oscillator (VCO) by 186 are phase-compared. The resultant phase difference signal is allowed to pass through a low pass filter and then returned to an input of the VCO, so as to constitute a phase locked loop (PLL) (hereinafter, such a PLL is called a wobble PLL), thereby to achieve phase-synchronization. As a result, the oscillation clock from the VCO serves as a channel clock frequency of a physical disk. By using the oscillation clock from the VCO as a recording reference clock for recording and reproduction of data, data can be recorded on the disk substantially in synchronization with the sectors of the disk.

When data is recorded on or reproduced from a disk using a fixed clock from a crystal oscillator, a synthesizer, or the like as a reference clock, the data recording or reproduction is directly influenced by variation factors such as a shift of the fixed clock, a variation in the rotation of a spindle motor, and a variation in the linear velocity due to eccentricity of the disk. When recording of data is influenced by any of such factors, it may become impossible to correctly reproduce the data written on the disk. In some cases, when recording of data is influenced by any of such factors, data may be written on the physical IDs, failing to read information originally written on the physical IDs.

On the contrary, when the wobble PLL clock described above is used for data recording, since the wobble PLL clock follows a variation in the rotation of a spindle motor and a variation in the linear velocity due to eccentricity of a disk, data which has absorbed all of the variation factors can be recorded.

However, if such a wobble PLL clock fails to be synchronous with the wobbling on the disk, using the wobble PLL clock as a reference clock may cause a problem, data may fail to be reproduced, or may be written on physical IDs.

As another problem, when a disk is defective, has dust attached, or poorly reflects light, a tracking error signal is not generated. This means that the wobble PLL clock loses one object for comparison, and thus the reliability of the clock itself is lost.

SUMMARY OF THE INVENTION

The optical disk recording apparatus of this invention includes: a first detection section for detecting a ID address cycle based on a timing of detection of an ID section of an optical disk; a second detection section for detecting a wobble cycle based on a wobble clock; and a state determination section for determining a state of the wobble clock based on the ID address cycle and the wobble cycle.

In one embodiment of the invention, the optical disk recording apparatus further includes a use determination section for detecting whether or not the wobble clock is usable based on the state of the wobble clock.

In another embodiment of the invention, the state determination section generates a threshold window based on the ID address cycle and determines the state of the wobble clock depending on whether or not a signal indicating the wobble cycle exists within the threshold window, and the use determination section determines that the wobble clock is usable when the signal indicating the wobble cycle exists within the threshold window.

In still another embodiment of the invention, the optical disk recording apparatus further includes a recording section for recording data, and recording stop/suspension determination section for determining whether or not the recording should be stopped/suspended based on the state of the wobble clock.

In still another embodiment of the invention, the state determination section generates a threshold window based on the ID address cycle and determines the state of the wobble clock depending on whether or not a signal indicating the wobble cycle exists within the threshold window, and the stop/suspension determination section stops/suspends the recording when the signal indicating the wobble cycle exists outside the threshold window.

Alternatively, the optical disk recording apparatus of this invention is for recording data on an optical disk having a track wobbled in a radial direction at a predetermined cycle in synchronization with a wobble clock by phase-synchronizing the cycle of the wobbling and an N-divided wobble clock (wherein N is a rational number). The optical disk recording apparatus includes: a failure determination section for determining whether or not a wobble signal has failed.

In one embodiment of the invention, the optical disk recording apparatus further includes a use determination section for determining whether or not the wobble clock is usable when the failure determination section determines that the wobble signal has failed.

In another embodiment of the invention, the optical disk recording apparatus reproduces the wobble signal recorded on the optical disk, and generates a digitized signal obtained by digitizing the reproduced wobble signal when the reproduced wobble signal has an amplitude equal to or more than a predetermined value, and the failure determination section determines that the wobble signal has failed when the digitized signal is not output for a predetermined time period.

In still another embodiment of the invention, the optical disk recording apparatus further includes a recording section for recording data, and a recording stop/suspension determination section for determining whether or not the recording should be stopped/suspended depending on the failure of the wobble signal.

In still another embodiment of the invention, the optical disk recording apparatus reproduces the wobble signal recorded on the optical disk, and generates a digitized signal obtained by digitizing the reproduced wobble signal when the reproduced wobble signal has an amplitude equal to or more than a predetermined value, the failure determination section determines that the wobble signal has failed when the digitized signal is not output for a predetermined time period, and the recording stop/suspension determination section stops/suspends the recording when the failure determination section determines that the wobble signal has failed.

In still another embodiment of the invention, the optical disk recording apparatus hold the wobble clock when the failure determination section determines that the wobble signal has failed for a predetermined time t1, and the optical disk recording apparatus makes the wobble clock unusable when the failure determination section determines that the wobble signal has failed for a predetermined time t2.

Alternatively, the optical disk recording apparatus of this invention includes: a wobble reproduced signal processing section for reproducing a wobble signal to output a reproduced signal; a digitizing section which does not output a digitized signal obtained by digitizing the reproduced signal when the reproduced signal has an amplitude less than a predetermined value or outputs the digitized signal when the reproduced signal has an amplitude equal to or more than the predetermined value; a first failure determination section for outputting a first failure signal when the digitized signal is not output for a predetermined time period t1; a second failure determination section for outputting a second failure signal when the digitized signal is not output for a predetermined time period t2; a wobble phase difference detection section for outputting a phase difference signal between the digitized signal output from the digitizing section and an N-divided output clock output from a VCO; a wobble PLL section for passing the phase difference signal output from the wobble phase difference detection section to the VCO via a low-pass filter; a PLL blocking section for blocking the wobble PLL section from passing the phase difference signal to the VCO, depending on the first failure signal; and a wobble clock usable determination section for determining whether or not the wobble clock is usable depending on the second failure signal.

In one embodiment of the invention, the optical disk recording apparatus holds the wobble clock when the failure determination section determines that the wobble signal has failed for a predetermined time t1, and the optical disk recording apparatus stops/suspends recording of information when the failure determination section determines that the wobble signal has failed for a predetermined time t2.

In another embodiment of the invention, the predetermined time t2 is longer than the predetermined time t1.

In still another embodiment of the invention, the predetermined time t2 is equal to or longer than the predetermined time t1.

Alternatively, the optical disk recording apparatus of this invention includes: a wobble reproduced signal processing section for reproducing a wobble signal to output a reproduced signal; a digitizing section which does not output a digitized signal obtained by digitizing the reproduced signal when the reproduced signal has an amplitude less than a predetermined value or outputs the digitized signal when the reproduced signal has an amplitude equal to or more than the predetermined value; a first failure determination section for outputting a first failure signal when the digitized signal is not output for a predetermined time period t1; a second failure determination section for outputting a second failure signal when the digitized signal is not output for a predetermined time period t2; a wobble phase difference detection section for outputting a phase difference signal between the digitized signal output from the digitizing section and an N-divided output clock output from a VCO; a wobble PLL section for passing the phase difference signal output from the wobble phase difference detection section to the VCO via a low-pass filter; a PLL blocking section for blocking the wobble PLL section from passing the phase difference signal to the VCO, depending on the first failure signal; and a stop/suspension section for stopping/suspending recording of information on the optical disk during the recording depending on the second failure signal.

According to another aspect of the invention, a method for recording data on an optical disk is provided. The method includes the steps of: detecting a ID address cycle based on a timing of detection of an ID section of the optical disk; detecting a wobble cycle based on a wobble clock; and determining a state of the wobble clock based on the ID address cycle and the wobble cycle.

In one embodiment of the invention, the method for recording data on an optical disk further includes the step of determining whether or not the wobble clock is usable based on the state of the wobble clock.

In another embodiment of the invention, the step of determining a state of the wobble clock generates a threshold window based on the ID address cycle and determines the state of the wobble clock depending on whether or not a signal indicating the wobble cycle is within the threshold window, and the step of determining whether or not the wobble clock is usable determines that the wobble clock is usable when the signal indicating the wobble cycle is within the threshold window.

In still another embodiment of the invention, the method for recording data on an optical disk further includes the steps of: recording data; and stopping/suspending the recording based on the state of the wobble clock.

In still another embodiment of the invention, the step of determining a state of the wobble clock generates a threshold window based on the ID address cycle and determines the state of the wobble clock depending on whether or not a signal indicating the wobble cycle is within the threshold window, and the step of stopping/suspending the recording stops/suspends the recording when the signal indicating the wobble cycle is outside the threshold window.

Alternatively, the method for recording data on an optical disk of this invention includes recording data on the optical disk having a track wobbled in a radial direction at a predetermined period in synchronization with a wobble clock by phase-synchronizing the cycle of the wobbling and an N-divided wobble clock (wherein N is a rational number). The method further includes the step of: determining whether or not a wobble signal has failed.

In one embodiment of the invention, the method for recording data on an optical disk further includes the step of: determining whether or not the wobble clock is usable when the step of determining whether or not a wobble signal has failed determines that the wobble signal has failed.

In another embodiment of the invention, the method for recording data on an optical disk further includes the steps of: recording data; and stopping/suspending the recording when the wobble signal has failed.

The "stopping/suspending" as used herein indicates that either one of stopping and suspending is performed.

Thus, the optical disk recording/reproduction apparatus according to the present invention records data on an optical disk having a plurality of sectors each composed of an ID section formed of prepits and a data section for data recording/reproduction having tracks wobbled in the radial direction at a predetermined cycle, in synchronization with a reference clock obtained by phase-synchronizing the cycle of the wobbling and an N-divided clock (wherein N is a natural number) (hereinafter, such a reference clock is called a wobble clock). The wobble clock is made usable if the difference between the sector cycle determined by reproduction of the physical ID and the sector cycle determined by counting the wobble clock is within a predetermined range, or made unusable if it is not within the predetermined range.

Alternatively, in the optical disk recording/reproduction apparatus according to the present invention which records and/or reproduces data on and/or from an optical disk having tracks wobbled in the radial direction at a predetermined cycle in synchronization with the wobble clock, the wobble clock is made unusable if the wobble signal fails for a predetermined time period.

Alternatively, in the optical disk recording/reproduction apparatus according to the present invention which records and/or reproduces data on and/or from an optical disk having tracks wobbled in the radial direction at a predetermined cycle in synchronization with the wobble clock, recording is stopped or suspended if the wobble signal has failed for a predetermined time period during the recording.

Alternatively, in the optical disk recording/reproduction apparatus according to the present invention which records and/or reproduces data on and/or from an optical disk having tracks wobbled in the radial direction at a predetermined cycle in synchronization with the wobble clock, the wobble clock is held if the wobble signal has failed for a predetermined time period t1, or the wobble clock is made unusable if it has failed for a predetermined time period t2 wherein t2>t1.

Alternatively, in the optical disk recording/reproduction apparatus according to the present invention which records and/or reproduces data on and/or from an optical disk having tracks wobbled in the radial direction at a predetermined cycle in synchronization with the wobble clock, the wobble clock is held if a portion of the wobble signal has failed for a predetermined time period t1, or recording is stopped or suspended if the wobble signal has failed for a predetermined t2 wherein t2>t1 during the recording.

Thus, the invention described herein makes possible the advantages of providing (1) an optical disk recording apparatus and (2) recording data on an optical disk, in which the state of a wobble signal is determined and recording of data on an optical disk is suspended or stopped if the state of the wobble signal does not satisfy predetermined conditions, so as to realize stable recording of data on the optical disk.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Example 1 according to the present invention will be described with reference to the relevant drawings.

Figure 1:
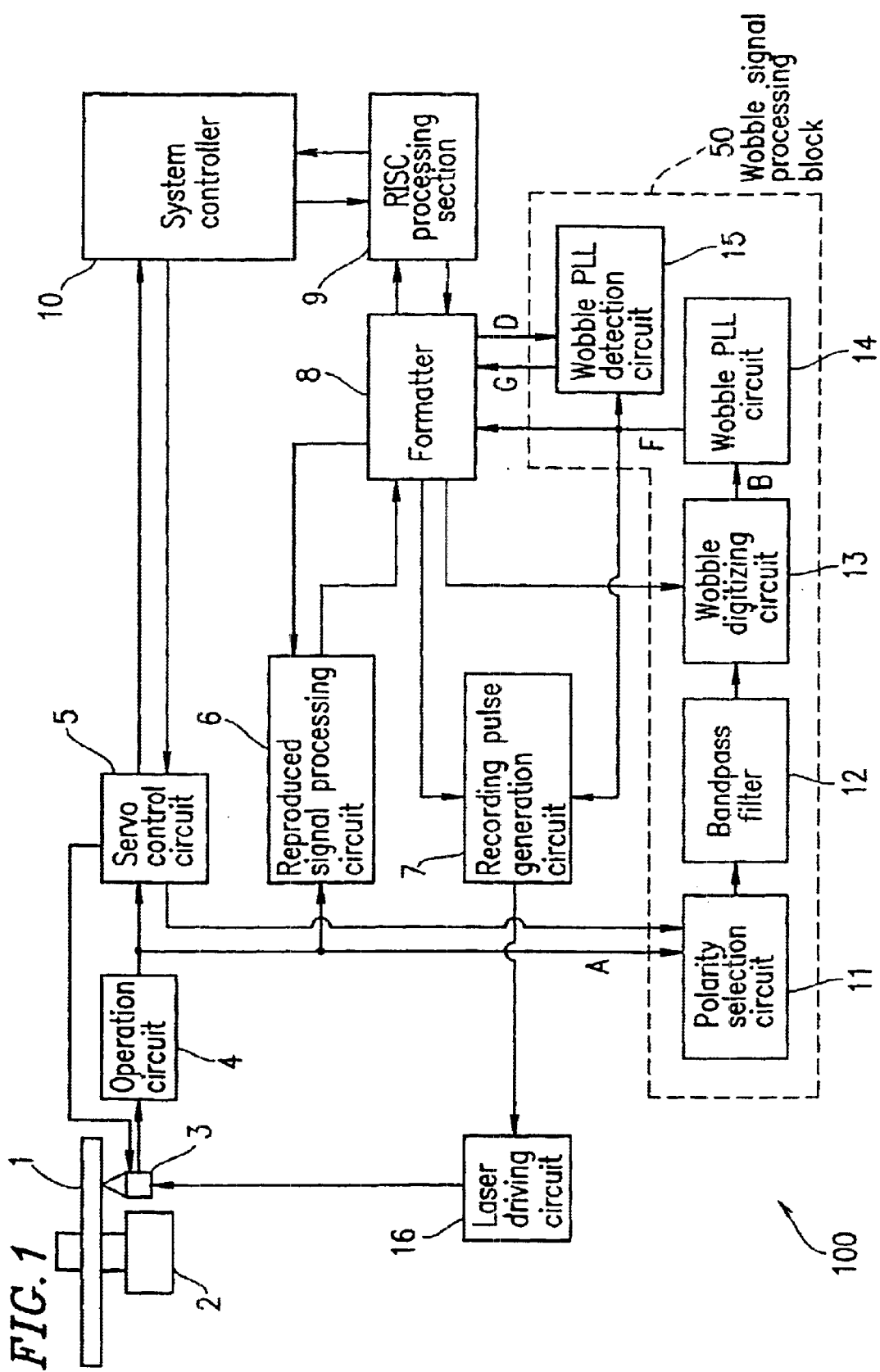
FIG. 1 is a block diagram illustrating an optical disk recording/reproduction apparatus of Example 1 according to the present invention.

FIG. 1 is a block diagram illustrating an optical disk recording/reproduction apparatus 100 of Example 1.

The optical disk recording/reproduction apparatus 100 includes a wobble signal processing block 50. The wobble signal processing block 50 detects a ID address cycle based on the detection timing at an ID section of an optical disk 1, detects a wobble cycle based on a wobble clock, and determines the state of the wobble clock based on the ID address cycle and the wobble cycle. The optical disk recording/reproduction apparatus 100 may further include a spindle motor 2 for rotating the optical disk 1, an optical head 3, an operation circuit 4, a servo control circuit 5, a reproduced signal processing circuit 6, a recording pulse generation circuit 7, a formatter 8, a reduced instruction set computer (RISC) processing section 9, a system controller 10, and a laser driving circuit 16.

The wobble signal processing block 50 includes a wobble PLL detection circuit 15. The wobble signal processing block 50 may further include a polarity selection circuit 11, a bandpass filter 12, a wobble digitizing circuit 13, and a wobble PLL circuit 14.

Figure 2:
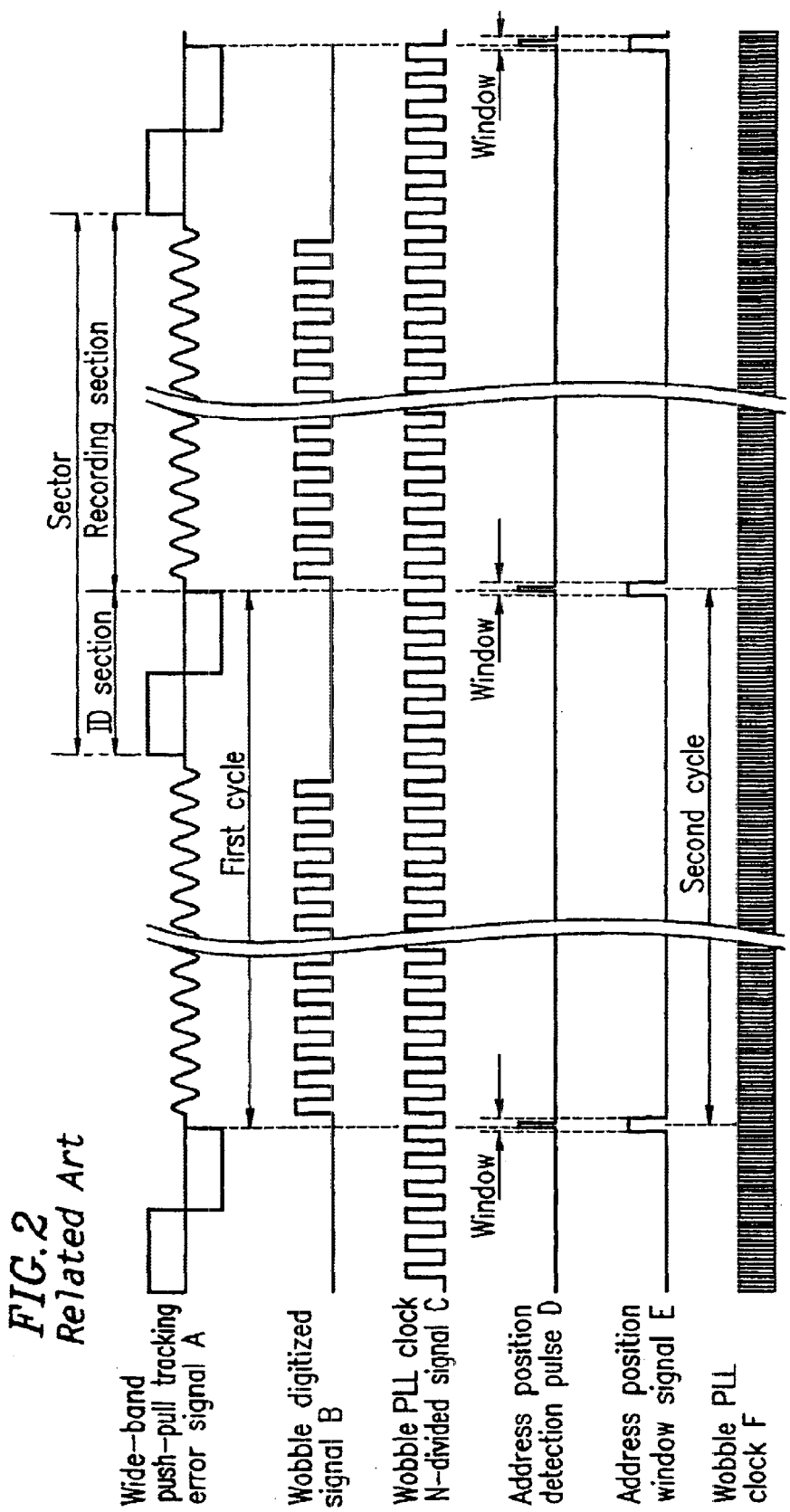
FIG. 2 is a view illustrating a wide-band push-pull tracking error signal A, a wobble digitized signal B, a wobble PLL clock N-divided signal C, an address position detection pulse D, an address position threshold window signal E, and a wobble PLL clock F, in a wobble usable state.
Figure 3:
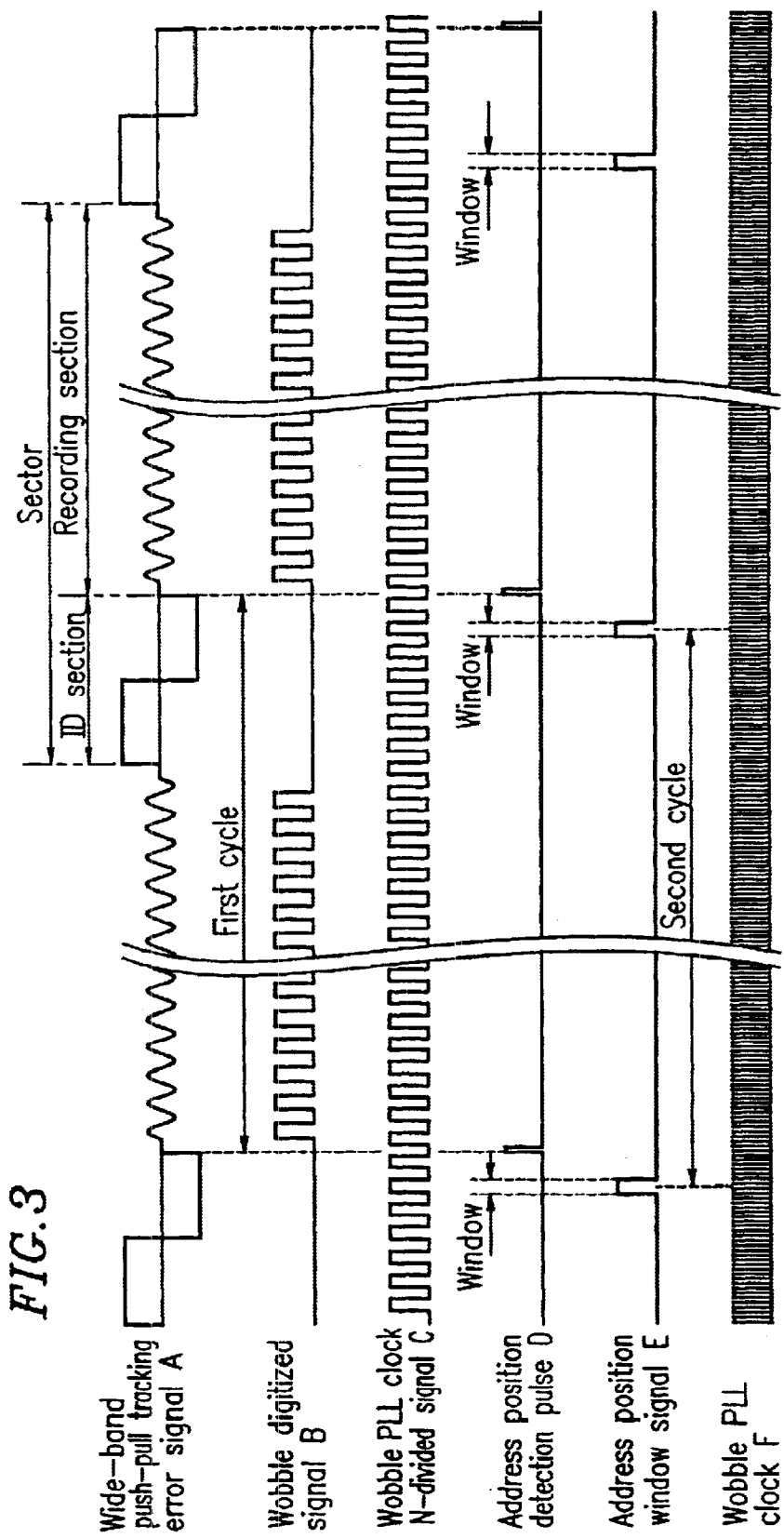
FIG. 3 is a view illustrating a wide-band push-pull tracking error signal A, a wobble digitized signal B, a wobble PLL clock N-divided signal C, an address position detection pulse D, an address position threshold window signal E, and a wobble PLL clock F, in a wobble unusable state.

Hereinbelow, the operation of the optical disk recording/reproduction apparatus. 100 will be described with reference to FIGS. 1 to 3. FIGS. 2 and 3 are views each illustrating a wide-band push-pull tracking error signal A, a wobble digitized signal B, a wobble PLL clock N-divided signal C (N is a rational number), an address position detection pulse D, an address position threshold window signal E, and a wobble PLL clock F.

Laser light emitted from the optical head 3 under control of the light amount by the laser driving circuit 16 is reflected from the optical disk 1 which is being rotated by the spindle motor 2. The reflected light from the optical disk 1 is received by a photo detector (not shown) of the optical head 3, and the output signal is subjected to current-voltage (I–V) conversion by a head amplifier (not shown). The I–V converted output signal is received by the operation circuit 4, which generates a focusing error signal, a tracking error signal, an address reproduced signal, the wobble reproduced signal, a wide-band push-pull tracking error signal A for data reproduction, and a sum signal from the photo detector.

The operation circuit 4 outputs the focusing error signal and the tracking error signal to the servo control circuit 5, the wide-band push-pull tracking error signal A and the sum signal from the photo detector to the reproduced signal processing circuit 6, and the wide-band push-pull tracking error signal A to the polarity selection circuit 11 in the wobble signal processing block 50.

The servo control circuit 5 performs focusing servo control for the optical head 3 so that a light spot (not shown) is focused on the recording surface of the optical disk 1. The servo control circuit 5 also performs tracking servo control so that the light spot follows a track of the optical disk 1 (a groove or a land between grooves on the recording surface of the optical disk 1). In this operation, assume that the gain of the tracking servo control is sufficiently lower than the frequency of the wobbling of the track of the optical disk 1 and that the tracking servo control does not follow the wobbling.

In the reproduced signal processing circuit 6, the wide-band push-pull tracking error signal A is selected for the ID section, while the sum signal from the photo detector is selected for the recording section, based on an ID section gate generated by the formatter 8. Upon activation of a lead gate generated by the formatter 8, the reproduced signal processing circuit 6 performs synchronization of addresses and data with clocks extracted by reproduction PLL control based on the addresses and data, and the results are output to the formatter 8 as digital data.

In a DVD-RAM, for example, the push-pull signal is used for reproduction of the ID section while the sum signal from the photo detector is used for reproduction of data. Therefore, switching between these signals is required when the reproduction circuit is shared. The ID section gate is a signal used for this switching. The ID section gate is active during the address period. For example, referring to FIG. 2, the ID section gate is in a high level during the period of the ID section and in a low level during the period of the recording section.

Figure 12:
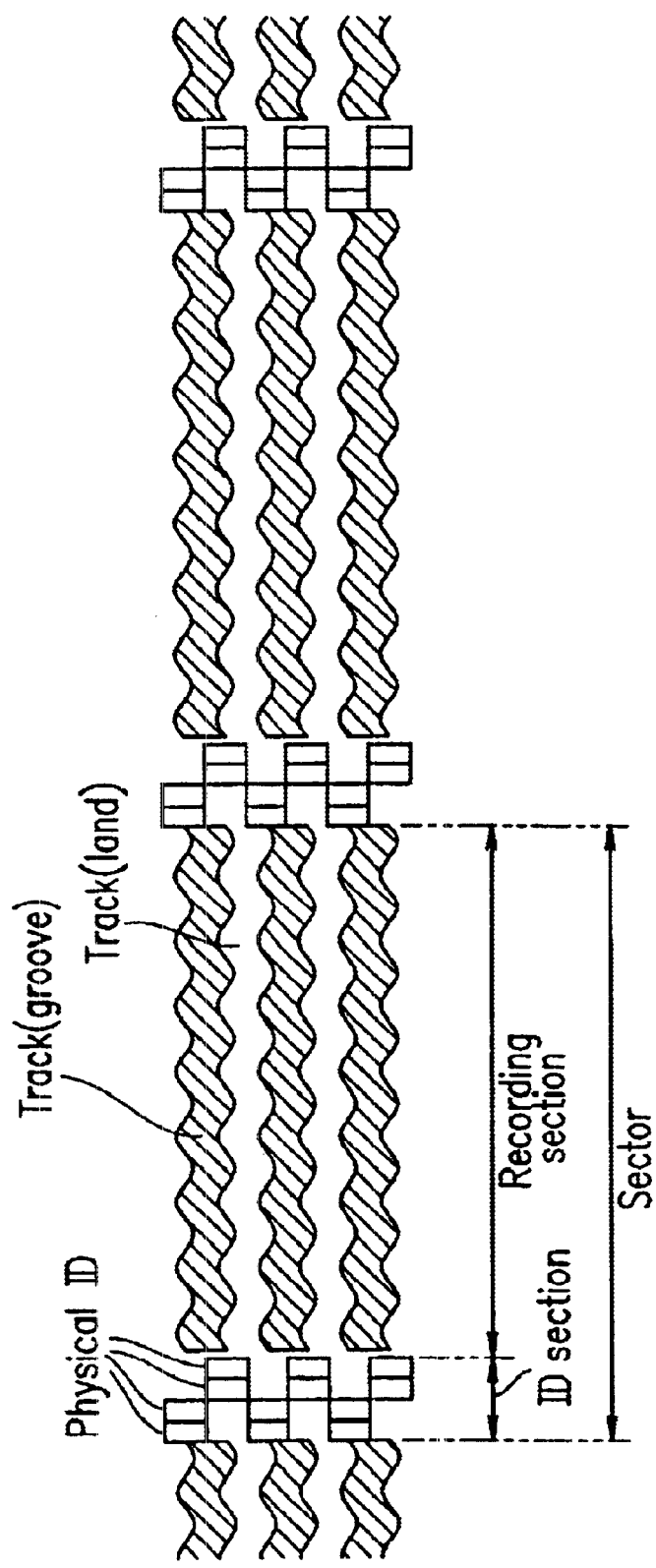
FIG. 12 is a view illustrating an example of a DVD-RAM format.

Referring to FIG. 12, no object to be reproduced exists between the reproduction of the upper two physical IDs and the reproduction of the lower two physical IDs and between the address reproduction and the data reproduction. If PLL control is attempted when no object to be reproduced exists, a target value determined by the PLL control is diverged, which may result in a failure to correctly perform subsequent address reproduction or data reproduction. In such a case, therefore, the PLL control is preferably stopped (suspended). The lead gate is a signal used to stop (suspend) the PLL control. The lead gate specifies the period during which the PLL control should be performed.

The lead gate is activated only for the ID section during the standby state where recording of data on the optical disk 1 is held in readiness and during recording where data is being recorded on the optical disk 1. During reproduction where data recorded on the optical disk 1 is being reproduced, the lead gate is activated for both the ID section and the data (recording) section.

The formatter 8 performs demodulation and error checking for signals corresponding to the plurality of physical IDs located at the head of a sector in the digital data reproduced by the reproduced signal processing circuit 6. Although a delay is generated in the signal processing for reproducing an address, the physical position of the plurality of physical IDs in the sector is detected based on the timing at which the plurality of physical IDs have been reproduced and the ID numbers, and the signal indicating the detected position is output to the wobble PLL detection circuit 15 as an address position detection pulse D.

The polarity selection circuit 11 of the wobble signal processing block 50 receives the wide-band push-pull tracking error signal A output from the operation circuit 4 and a signal indicating the polarity of tracking, i.e., whether the track is a land or a groove, output from the servo control circuit 5. The polarity selection circuit 11 selects the polarity of the signal received from the operation circuit 4 to be output to the bandpass filter 12 based on the signal received from the servo control circuit 5.

The bandwidth of the bandpass filter 12 is determined so that recording of data on the optical disk 1 and reproduction of data recorded on the optical disk 1 are possible for different linear velocities. Specifically, the bandpass filter 12 has a bandwidth that is determined considering the standard linear velocity at which a light spot follows a track of the optical disk 1 and the frequency obtained from the cycle of the wobbling of the track originally formed on the optical disk 1 as a basis, so that a wobble signal can pass therethrough reliably even for a linear velocity in a range of a half to double the standard linear velocity.

The wobble digitizing circuit 13 receives the signal output from the bandpass filter 12 and performs analog to digital conversion for the received signal to output the wobble digitized signal B. During this digitization, the wobble digitizing circuit 13 masks the ID section and several pulses subsequent to the ID section of the digitized signal by use of the ID section gate generated by the formatter 8 before outputting the wobble digitized signal B. By this masking, the ID section of the digitized signal is fixed to a low level.

The wobble PLL circuit 14 includes a voltage controlled oscillator (VCO; not shown). A signal obtained by dividing a clock output from the VCO by N (wherein N is the number of channel clocks in the wobble cycle) is phase-synchronized with the masked wobble digitized signal received from the wobble digitizing circuit 13. In order to achieve this, a phase difference signal between the wobble digitized signal and the N-divided VCO clock is fed back to an input terminal of the VCO via a low-pass filter (not shown). The wobble PLL circuit 14 outputs the resultant wobble PLL clock F generated by the VCO to the recording pulse generation circuit 7, the formatter 8, and the wobble PLL detection circuit 15.

The formatter 8 determines, based on a wobble usable 1 signal output from the wobble PLL detection circuit 15, which will be described hereinafter, whether or not it should generate a plurality of gates from the wobble PLL clock F generated by the VCO of the wobble PLL circuit 14, whether or not constant linear velocity (CLV) control based on the wobble PLL clock F should be performed, or whether or not data should be recorded on the optical disk based on the wobble PLL clock F. The produced gates are used for recording and reproduction of data and the like.

When data is to be recorded on the optical disk 1, the RISC processing section 9 performs at least one of the processings, i.e., addition of an error correction code, interleaving, and scrambling, for data output from the system controller 10. The thus-processed data is output to the formatter 8 and stored in a FIFO (first in first out) memory (not shown) in the formatter 8.

The system controller 10 sets a recording target sector for the formatter 8. When reaching the recording target sector during reproduction of addresses, the formatter 8 modulates data in the FIFO memory, and while adding a pattern of a variable frequency oscillator (VFO), a synchronous code (SYNC), and the like to the modulated data, outputs the modulated data to the recording pulse generation circuit 7. The recording pulse generation circuit 7 processes the modulated data output from the formatter 8 to produce a pulse light beam for allowing a laser to actually emit light and outputs the pulse light beam to the laser driving circuit 16, which drives the laser to realize recording data on the optical disk 1.

Figure 4:
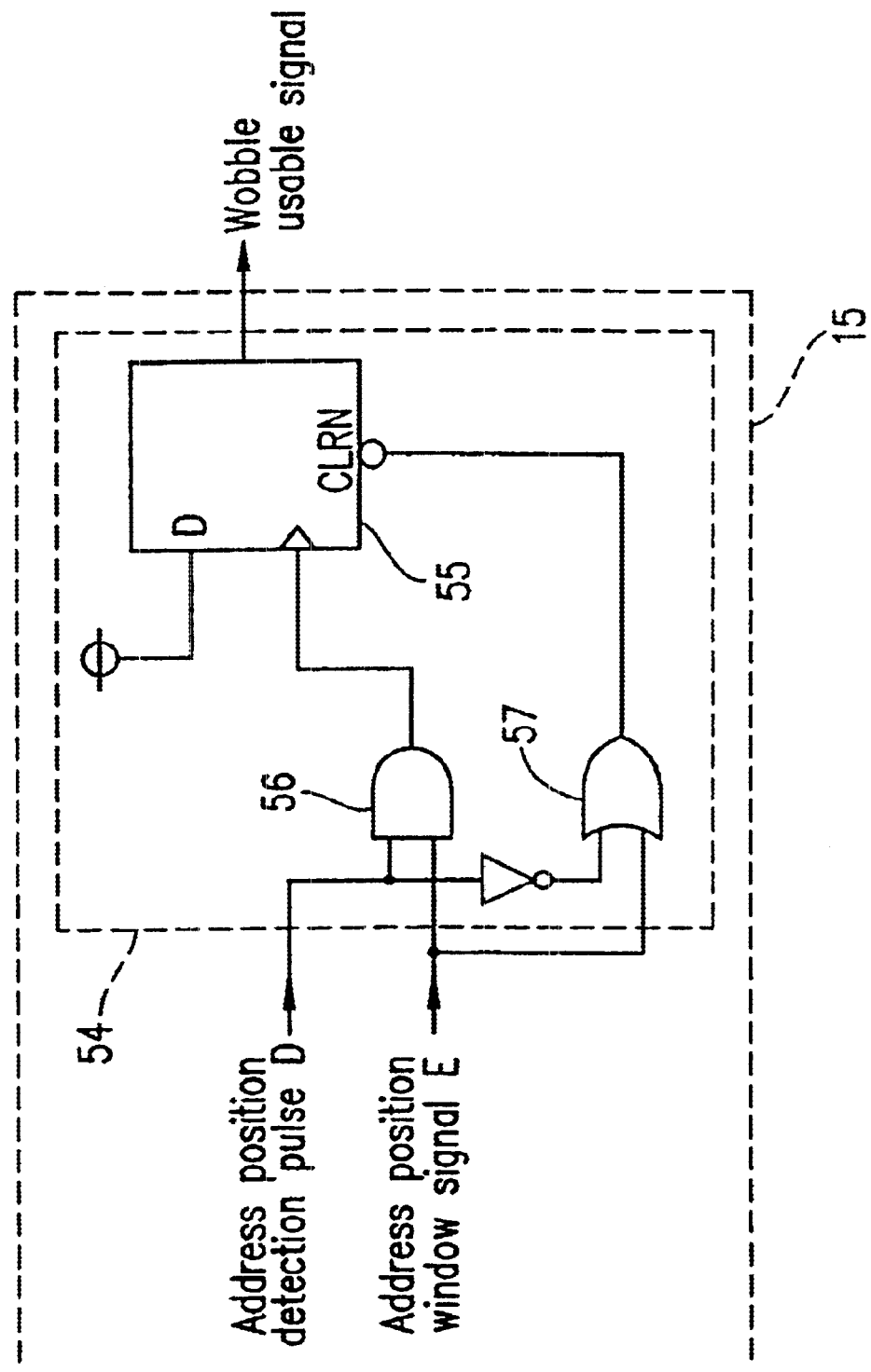
FIG. 4 is a view illustrating a portion of a wobble PLL detection circuit of Example 1 according to the present invention.

Hereinbelow, the detailed construction and operation of the wobble PLL detection circuit 15 will be described with reference to FIGS. 4 and 5. FIG. 4 is a block diagram illustrating a portion of the wobble PLL detection circuit 15, and FIG. 5 is a block diagram illustrating a remaining portion of the wobble PLL detection circuit 15.

Figure 5:
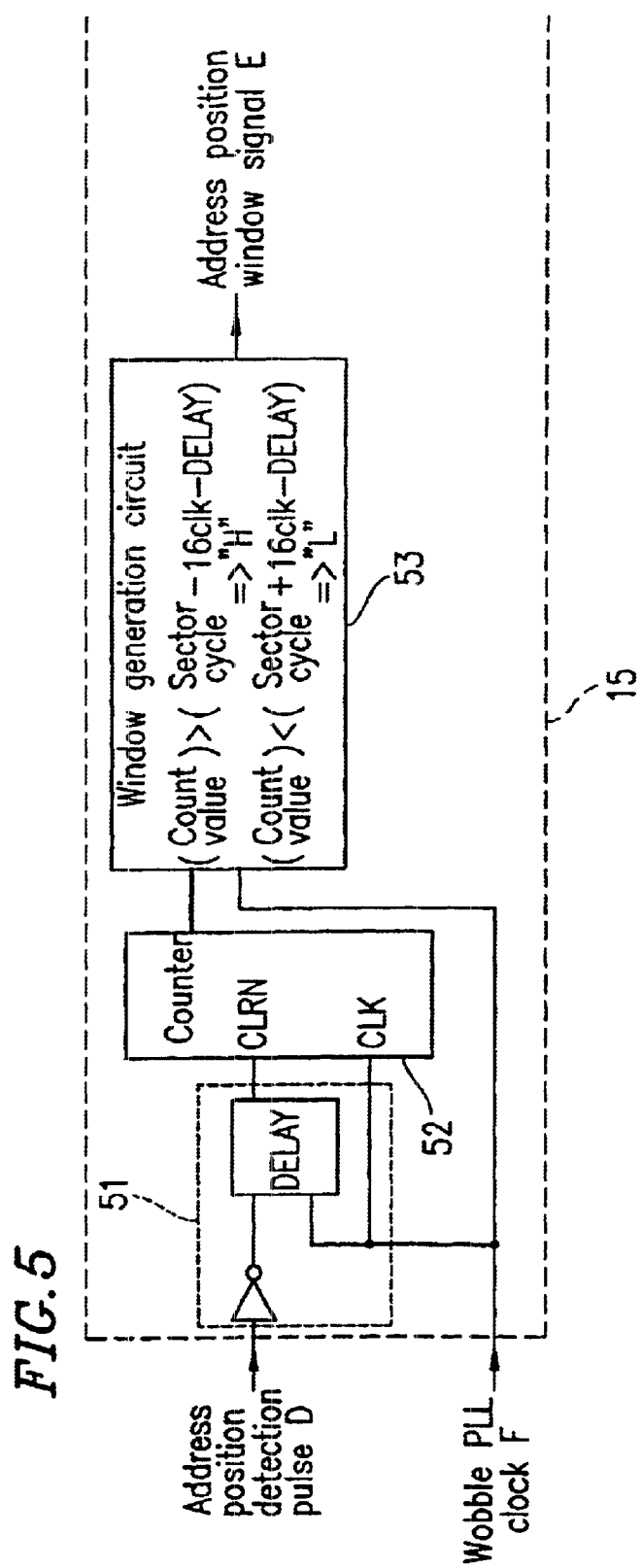
FIG. 5 is a view illustrating a remaining portion of the wobble PLL detection circuit of Example 1 according to the present invention.

The wobble PLL detection circuit 15 includes a delay 51, a counter 52, a threshold window generation circuit 53, and a determination section 54 as shown in FIG. 5.

The delay 51 adds a fixed amount of delay to the address position detection pulse D generated based on the physical address position, so that a counter 52 is reset by the delayed signal detected by the formatter 8. The reset counter 52 starts counting using the wobble PLL clock F output from the wobble PLL circuit 14. For example, assume that one sector of the optical disk 1 includes 43152 channel clocks, the delay amount of the delay 51 is one channel clock, and the tolerance of the wobble PLL clock F is ±16 channel clocks. In this case, the threshold window generation circuit 53 opens a threshold window when the value of the counter 52 reaches 43135 (=43152−16−1) and closes the threshold window when it reaches 43167 (=43152+16−1). In this example, the address position threshold window signal E output from the threshold window generation circuit 53 indicates that the threshold window is opened when it shifts from a low level to a high level, and that the threshold window is closed when it shifts from the high level to the low level. Alternatively, the address position threshold window signal E may indicate that the threshold window is opened when it shifts from the high level to the low level, and that the threshold window is closed when it shifts from the low level to the high level.

The delay 51 and the threshold window generation circuit 53 operate in synchronization with each other by the wobble PLL clock F. In this regard, the delay 51 can delay the address position detection pulse D by X clocks of the wobble PLL clock F.

The determination section 54 shown in FIG. 4 receives the address position detection pulse D and the address position threshold window signal E, so as to determine the state of the wobble PLL clock F. When the address position detection pulse D is detected while the threshold window is opened as shown in FIG. 2, the signal output from an AND gate 56 of the determination section 54 shown in FIG. 4 becomes a high level. When a flipflop 55 detects the rising of the signal output from the AND gate 56, the flipflop 55 sets a wobble usable 1 signal G at a high level.

When the wobble usable 1 signal G is in a high level, the difference between the length of one sector detected based on the physical address positions and the length of one sector counted with the wobble PLL clock F synchronized by the wobble PLL circuit 14 is within ±16 clocks. More specifically, if the difference between the reference clock and the counted wobble PLL clock F during the scanning of a sector immediately preceding a sector having a data section providing information for generating the address position detection pulse D is within ±16 channel clocks, the formatter 8 determines that the wobble PLL clock F generated by the wobble PLL circuit 14 can be used for recording. By this determination, gate signals are generated from the wobble PLL clock F, CLV control is performed based on the wobble PLL clock F, or data is recorded on the optical disk 1 using the wobble PLL clock F as a reference clock.

FIG. 3 shows the respective signals in the case where the address position detection pulse D is not detected while the threshold window is opened. In the case shown in FIG. 3, the frequency of the wobble PLL clock 7 is higher than that of the actual wobbling.

In the above case, since the address position detection pulse D is not located within the threshold window, a signal output from an OR gate 57 of the determination section 54 becomes a low level at the moment when the address position detection pulse D is generated. This clears the flipflop 55, thereby setting the wobble usable 1 signal G at a low level. In this case, gate signals are not generated from the wobble PLL clock F, CLV control is not performed based on the wobble PLL clock F, and/or data is not recorded on the optical disk 1 using the wobble PLL clock F as a reference clock.

When the optical disk recording/reproduction apparatus 100 is designed so that data is recorded in synchronization with the wobble PLL clock F output from the wobble PLL circuit 14 and the address position detection pulse D is not located within the threshold window, no data recording is performed. Even when data is being sequentially recorded on a predetermined region of a sector, the recording is immediately suspended if the address position detection pulse D is not located within the threshold window.

In this example, the threshold window forming method is employed for detecting a difference between the physical sector cycle by address reproduction and the sector cycle based on the wobble clock. Alternatively, the physical sector cycle by address production may be counted with the wobble clock, and the count value may be compared with the regulation value to detect the difference. In this case, also, substantially the same effect can be obtained.

In the case where the address of one sector in a sequence of sectors fail to be reproduced, for example, in the case where the sector cycle of one sector fails to be determined, substantially the same effect as that obtained by the optical disk recording/reproduction apparatus 100 can be obtained by performing the following. That is, the number of wobble clocks to be counted is increased from the number in the case of the above-described optical disk recording/reproduction apparatus, by a number obtained by adding one to the number of sectors interposed between sectors of which addresses have been reproduced, and the cycle between the address positions of the reproduced addresses is used.

EXAMPLE 2

Example 2 according to the present invention will be described with reference to the relevant drawings.

Figure 6:
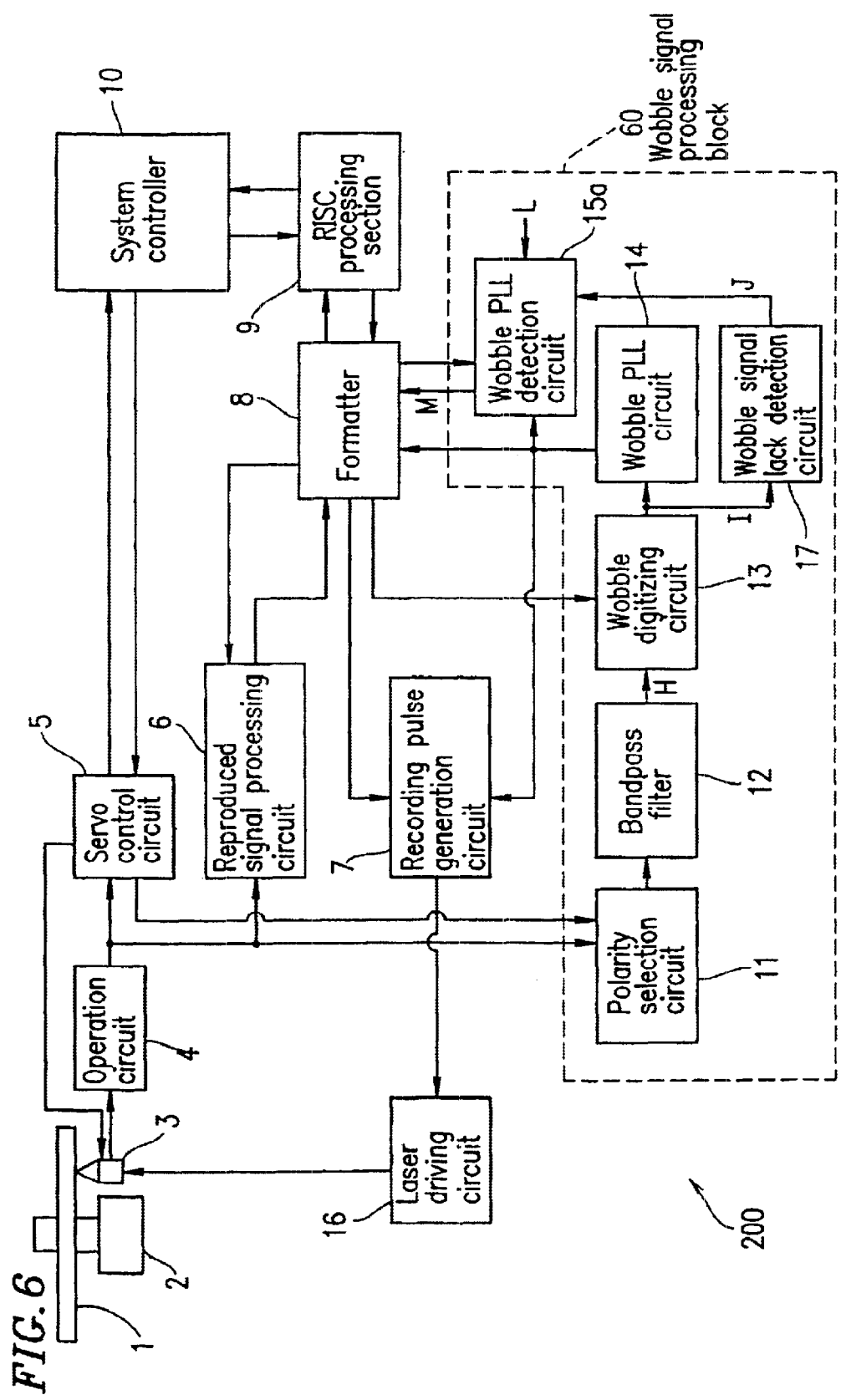
FIG. 6 is a block diagram illustrating an optical disk recording/reproduction apparatus of Example 2 according to the present invention.

FIG. 6 is a block diagram illustrating an optical disk recording/reproduction apparatus 200 of Example 2.

The optical disk recording/reproduction apparatus 200 includes a wobble signal processing block 60. The construction of the wobble signal processing block 60 is substantially the same as that of the wobble signal processing block 50 of the optical disk recording/reproduction apparatus 100, except for a wobble PLL detection circuit 15a and a wobble signal failure detection circuit 17.

Laser light emitted from the optical head 3 under control of the light amount by the laser driving circuit 16 is reflected from the optical disk 1 which is being rotated by the spindle motor 2. The reflected light from the optical disk 1 is received by a photo detector (not shown) of the optical head 3, and the output signal is subjected to current-voltage (I–V) conversion by a head amplifier (not shown). The I–V converted output signal is received by the operation circuit 4, which generates a focusing error signal, a tracking error signal, an address reproduced signal, a wobble reproduced signal, a wide-band push-pull tracking error signal A for data reproduction, and a sum signal from the photo detector.

The operation circuit 4 outputs the focusing error signal and the tracking error signal to the servo control circuit 5, the wide-band push-pull tracking error signal and the sum signal from the photo detector to the reproduced signal processing circuit 6, and the wide-band push-pull tracking error signal to the polarity selection circuit 11 in the wobble signal processing block 60.

The servo control circuit 5 performs focusing servo control for the optical head 3 so that a light spot (not shown) is focused on the recording surface of the optical disk 1. The servo control circuit 5 also performs tracking servo control so that the light spot follows a track of the optical disk 1 (a groove or a land between grooves on the recording surface of the optical disk 1). In this operation, assume that the gain in the tracking servo control is sufficiently lower than the frequency of the wobbling of the track of the optical disk 1 and that the tracking servo control does not follow the wobbling.

In the reproduced signal processing circuit 6, the wide-band push-pull tracking error signal A is selected for the ID section, while the sum signal from the photo detector is selected for the recording section thereof, based on an ID section gate generated by the formatter 8. Upon activation of a lead gate generated by the formatter 8, the reproduced signal processing circuit 6 performs reproduction PLL for an address and data, and the resultant signal is output to the formatter 8 as digital data.

The lead gate is activated only for the ID section during the standby state where recording of data on the optical disk 1 is held in readiness and during recording where data is being recorded on the optical disk 1. During reproduction where data recorded on the optical disk 1 is being reproduced, the lead gate is activated for both the ID section and the data (recording) section.

The formatter 8 performs demodulation and error checking for signals corresponding to the plurality of physical IDs located at the head of a sector of the digital data reproduced by the reproduced signal processing circuit 6. Although a delay is generated in the signal processing for reproducing the address, the physical position of the plurality of physical IDs in the sector is detected based on the timing at which the plurality of physical IDs have been reproduced and the ID numbers, and the signal indicating the detected position is output to the wobble PLL detection circuit 15a as an address position detection pulse D.

The polarity selection circuit 11 of the wobble signal processing block 60 receives the wide-band push-pull tracking error signal output from the operation circuit 4 and a signal indicating the polarity of tracking, i.e., whether the track is a land or a groove, output from the servo control circuit 5. The polarity selection circuit 11 selects the polarity of the signal received from the operation circuit 4 to be output to the bandpass filter 12 based on the signal received from the servo control circuit 5.

The bandwidth of the bandpass filter 12 is determined so that recording of data on the optical disk 1 and reproduction of data recorded on the optical disk 1 are possible for different linear velocities. Specifically, the bandpass filter 12 has a bandwidth that is determined considering as a center the standard linear velocity at which a light spot follows a track of the optical disk 1 and the frequency obtained from the cycle of the wobbling of the track originally formed on the optical disk 1 as a basis, so that a wobble signal can pass therethrough reliably even for a linear velocity in a range of a half to double the standard linear velocity.

The wobble digitizing circuit 13 receives a wobble signal H (FIG. 7) output from the bandpass filter 12 and performs analog to digital conversion for the wobble signal H. In the digitization of the wobble signal H output from the bandpass filter 12, the slice level may be a level offset with respect to the center of an envelope of the wobble signal H output from the bandpass filter 12, or the slice level may be a level offset with respect to level 0 of the bandpass filter 12. For example, when the amplitude of the wobble signal is small, a wobble digitized signal I (FIG. 7) is not output from the wobble digitizing circuit 13, i.e., the wobble digitized signal I is in a low level.

During the above digitization, the wobble digitizing circuit 13 masks the digitized signal corresponding to the ID section and several pulses subsequent to the digitized signal corresponding to the ID section by use of the ID section gate generated by the formatter 8. Then, the masked signal is output from the wobble digitizing circuit 13. By this masking, the digitized signal corresponding to the ID section is fixed to a low level.

The wobble PLL circuit 14 includes a VCO (not shown). A signal obtained by dividing a clock from the VCO by N (wherein N is the number of channel clocks in the wobble cycle) is phase-synchronized with the masked wobble digitized signal I output from the wobble digitizing circuit 13. In order to achieve this, a phase difference signal between the wobble digitized signal I and the N-divided VCO clock is fed back to an input terminal of the VCO via a low-pass filter (not shown). The wobble PLL circuit 14 outputs the resultant wobble PLL clock generated by the VCO to the recording pulse generation circuit 7, the formatter 8, and the wobble PLL detection circuit 15a.

The wobble signal failure detection circuit 17 detects a rising edge of the wobble digitized signal I and outputs a wobble failure detection signal when the wobble signal has failed for a predetermined time period.

The formatter 8 determines based on a wobble usable 2 signal output from the wobble PLL detection circuit 15a, which will be described hereinafter, whether or not it should generate a plurality of gates from the wobble PLL clock generated by the VCO of the wobble PLL circuit 14, whether or not CLV control based on the wobble PLL clock should be performed, or whether or not data should be recorded on the optical disk 1 based on the wobble PLL clock.

When data is to be recorded on the optical disk 1, the RISC processing section 9 performs at least one of the processings, i.e., addition of an error correction code, interleaving, and scrambling, for data output from the system controller 10. The thus-processed data is output to the formatter 8 and stored in a FIFO memory (not shown) in the formatter 8.

The system controller 10 sets a recording target sector for the formatter 8. When reaching the recording target sector during reproduction of addresses, the formatter 8 modulates data in the FIFO memory, and while adding VFO pattern, SYNC, and the like to the modulated data, outputs the modulated data to the recording pulse generation circuit 7. The recording pulse generation circuit 7 processes the modulated data output from the formatter 8 to produce a pulse light beam for allowing a laser to actually emit light and outputs the pulse light beam to the laser driving circuit 16, which drives the laser to realize recording data on the optical disk 1.

Figure 7:
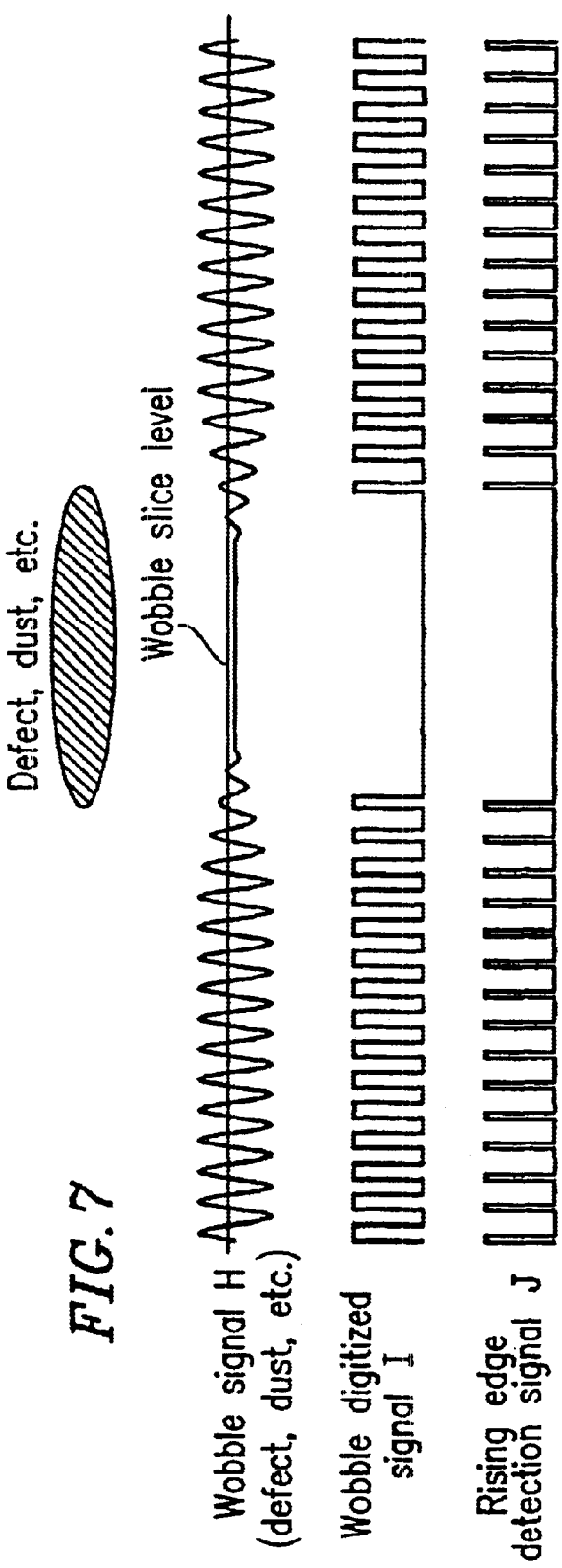
FIG. 7 is a view illustrating a wobble signal H, a wobble digitized signal I, and a rising edge detection signal J, when a defect exists on an optical disk.
Figure 8:
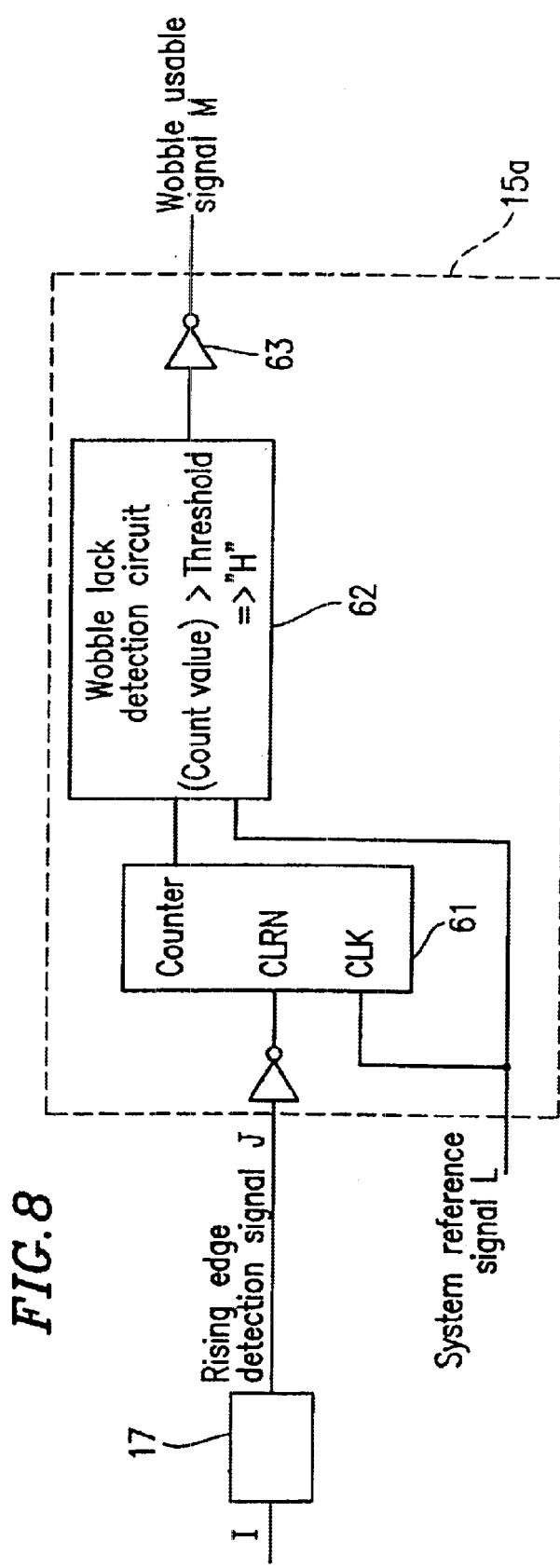
FIG. 8 is a view illustrating a wobble PLL detection circuit of Example 2 according to the present invention.

Hereinbelow, the detailed construction and operation of the wobble PLL detection circuit 15a will be described with reference to FIGS. 7 and 8. FIG. 7 is a view illustrating the wobble signal H, the wobble digitized signal I, and a rising edge detection signal J in the case where a defect, attachment of dust, or the like is generated on the recording section of a sector, preventing the optical disk 1 from reflecting light. FIG. 8 is a block diagram illustrating the wobble PLL detection circuit 15a.

The wobble PLL detection circuit 15a includes a counter 61 and a wobble failure detection circuit 62 as a determination section as shown in FIG. 8.

In the case where a defect, attachment of dust, or the like is generated on the recording section of a sector preventing the optical disk 1 from reflecting light, the wobble digitized signal I digitized with the offset slice level having an offset described above becomes a low level in the portion where the defect or the like has been generated. The wobble signal failure detection circuit 17 detects a rising edge of the wobble digitized signal I, and generates the rising edge detection signal J indicating the rising edge of the wobble digitized signal I. When the wobble digitized signal I is in the low level, the rising edge detection signal J is also in a low level.

The counter 61 is reset every pulse of the rising edge detection signal J generated by the wobble signal failure detection circuit 17. When the rising edge of the wobble digitized signal I is detected at a predetermined wobble cycle, the value of the counter 61 is always equal to or less than a predetermined value. The wobble failure detection circuit 62 therefore outputs a low-level signal. This low-level signal is inverted by an inverter 63, so that the wobble PLL detection circuit 15a outputs a high-level wobble usable 2 signal M.

The predetermined value mentioned above is a threshold with which a failure of the wobble signal can be determined, which is a count number corresponding to a cycle two or more times the wobble cycle. The wobble cycle as used herein indicates a cycle N times the wobble clock or the system reference clock.

When a defect or dust exists on the optical disk 1, the wobble signal failure detection circuit 17 fails to detect the rising edge of the wobble digitized signal I, and thus the counter 61 is not reset. When the value of the counter 61 becomes or exceeds the predetermined value, the wobble failure detection circuit 62 outputs a high-level signal. This high-level signal is inverted by the inverter 63, so that the wobble PLL detection circuit 15a outputs a low-level wobble usable 2 signal M.

After the optical spot has passed the defect portion, the counter 61 is reset by the rising edge detection signal J, turning the wobble usable 2 signal M to the high level. However, since the wobble PLL clock after passing the defect portion fails reliability, once wobble failure is detected, i.e., once the formatter 8 detects that the wobble usable 2 signal M has become a low level, the formatter 8 stops or suspends the recording on the defective sector.

Thus, in this example, it is possible to prevent erroneous recording due to failure of the wobble PLL clock which may occur when the wobble signal fails while data is being recorded on a predetermined region of a sector.

Example 2 may be combined with Example 1. For example, the formatter 8 may receive a signal obtained by calculating logical AND of the wobble usable 1 signal in Example 1 and the wobble usable 2 signal in Example 2, so as to realize both operations of wobble PLL clocking and stopping or suspending recording when a signal fails. The determination on whether or not the wobble clock is usable at the start of recording is not limited to the method described in Example 1.

In Example 2, the failure of the wobble signal is detected by digitizing the wobble signal by providing an offset to measure the length of a continuing low level of the signal. Alternatively, substantially the same effect as that described in Example 2 can be obtained by measuring the length of a continuing time period during which the amplitude of the wide-band push-pull tracking error signal or the signal having just passed the bandpass filter 12 is equal to or less than a predetermined value.

Substantially the same effect as that described in Example 2 can also be obtained by integrating the amplitude level of the wide-band push-pull tracking error signal or the signal having just passed the bandpass filter 12 and digitizing the integrated signal with a predetermined value.

In Example 2, the wobble signal failure detection circuit 17 detects a rising edge of the wobble digitized signal output from the wobble digitizing circuit 13. Alternatively, a falling edge of the wobble digitized signal may be detected.

EXAMPLE 3

Example 3 according to the present invention will be described with reference to the relevant drawings.

Figure 9:
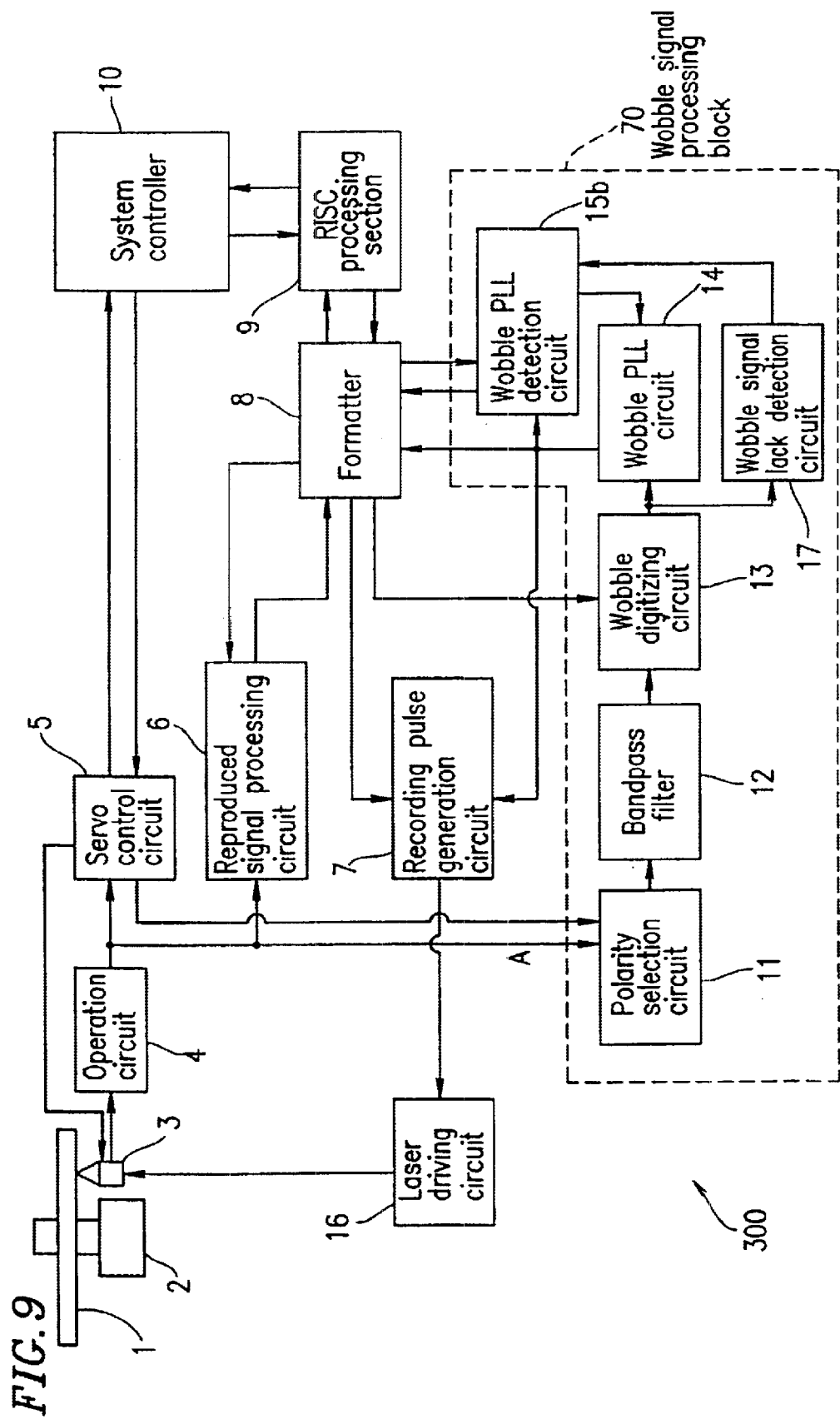
FIG. 9 is a block diagram illustrating an optical disk recording/reproduction apparatus of Example 3 according to the present invention.

FIG. 9 is a block diagram illustrating an optical disk recording/reproduction apparatus 300 of Example 3.

The optical disk recording/reproduction apparatus 300 includes a wobble signal processing block 70. The construction of the wobble signal processing block 70 is substantially the same as that of the wobble signal processing block 50 of the optical disk recording/reproduction apparatus 100, except for a wobble PLL detection circuit 15b and a wobble signal failure detection circuit 17.

Laser light emitted from the optical head 3 under control of the light amount by the laser driving circuit 16 is reflected from the optical disk 1 which is being rotated by the spindle motor 2. The reflected light from the optical disk 1 is received by a photo detector (not shown) of the optical head 3, and the output signal is subjected to current-voltage (I–V) conversion by a head amplifier (not shown). The I–V converted output signal is received by the operation circuit 4, which generates a focusing error signal, a tracking error signal, an address reproduced signal, a wobble reproduced signal, a wide-band push-pull tracking error signal A for data reproduction, and a sum signal from the photo detector.

The operation circuit 4 outputs the focusing error signal and the tracking error signal to the servo control circuit 5, the wide-band push-pull tracking error signal and the sum signal from the photo detector to the reproduced signal processing circuit 6, and the wide-band push-pull tracking error signal to the polarity selection circuit 11 in the wobble signal processing block 70.

The servo control circuit 5 performs focusing servo control for the optical head 3 so that a light spot (not shown) is focused on the recording surface of the optical disk 1. The servo control circuit 5 also performs tracking servo control so that the light spot follows a track of the optical disk 1 (a groove or a land between grooves on the recording surface of the optical disk 1). In this operation, assume that the gain in the tracking servo control is sufficiently lower than the frequency of the wobbling of the track of the optical disk 1 and that the tracking servo control does not follow the wobbling.

In the reproduced signal processing circuit 6, the wide-band push-pull tracking error signal A is selected for the ID section of a sector of the signal, while the sum signal from the photo detector is selected for the recording section thereof, based on an ID section gate generated by the formatter 8. Upon activation of a lead gate generated by the formatter 8, the reproduced signal processing circuit 6 performs reproduction PLL for an address and data, and the resultant signal is output to the formatter 8 as digital data.

The lead gate is activated only for the ID section during the standby state where recording of data on the optical disk 1 is held in readiness and during recording where data is being recorded on the optical disk 1. During reproduction where data recorded on the optical disk 1 is being reproduced, the lead gate is activated for both the ID section and the data (recording) section.

The formatter 8 performs demodulation and error checking for signals corresponding to the plurality of physical IDs located at the head of a sector of the digital data reproduced by the reproduced signal processing circuit 6. Although a delay is generated in the signal processing for reproducing the address, the physical position of a plurality of physical IDs in the sector is detected based on the timing at which the plurality of physical IDs has been reproduced and the ID numbers, and the signal indicating the detected portion is output to the wobble PLL detection circuit 15b as an address position detection pulse D.

The polarity selection circuit 11 of the wobble signal processing block 70 receives the wide-band push-pull tracking error signal output from the operation circuit 4 and a signal indicating the polarity of tracking, i.e., whether the track is a land or a groove, output from the servo control circuit 5. The polarity selection circuit 11 selects the polarity of the signal received from the operation circuit 4 to be output to the bandpass filter 12 based on the signal received from the servo control circuit 5.

The bandwidth of the bandpass filter 12 is determined so that recording of data on the optical disk 1 and reproduction of data recorded on the optical disk 1 are possible for different linear velocities. Specifically, the bandpass filter 12 has a bandwidth that is determined considering the standard linear velocity at which a light spot follows a track of the optical disk 1 and the frequency obtained from the cycle of the wobbling of the track originally formed on the optical disk 1 as a basis, so that a wobble signal can pass therethrough reliably even for a linear velocity in a range of a half to double the standard linear velocity.

The wobble digitizing circuit 13 receives the wobble signal output from the bandpass filter 12 and performs analog to digital conversion for the wobble signal. In the digitization of the wobble signal output from the bandpass filter 12, the slice level may be a level offset with respect to the center of an envelope of the wobble signal output from the bandpass filter 12, or the slice level may be a level offset with respect to level 0 of the bandpass filter 12. For example, when the amplitude of the wobble signal is small, the wobble digitized signal is not output from the wobble digitizing circuit 13, i.e., the wobble digitized signal is in a low level.

During the above digitization, the wobble digitizing circuit 13 masks the digitized signal corresponding to the ID section and several pulses subsequent to the digitized signal corresponding to the ID section by use of the ID section gate generated by the formatter 8. Then, the masked signal is output from the wobble digitizing circuit 13. By this masking, the digitized signal corresponding to the ID section is fixed to a low level.

The wobble PLL circuit 14 includes a VCO (not shown). A signal obtained by dividing a clock from the VCO by N (wherein N is the number of channel clocks in the wobble cycle) is phase-synchronized with the masked wobble digitized signal output from the wobble digitizing circuit 13. In order to achieve this, a phase difference signal between the wobble digitized signal and the N-divided VCO clock is fed back to an input terminal of the VCO via a low-pass filter (not shown). The wobble PLL circuit 14 outputs the resultant wobble PLL clock generated by the VCO to the recording pulse generation circuit 7, the formatter 8, and the wobble PLL detection circuit 15b.

The wobble signal failure detection circuit 17 detects a rising edge of the wobble digitized signal and outputs a wobble failure detection signal when the wobble signal has failed for a predetermined time period.

The formatter 8 determines, based on a wobble usable 3 signal output from the wobble PLL detection circuit 15b, which will be described hereinafter, whether or not it should generate a plurality of gates from the wobble PLL clock generated by the VCO of the wobble PLL circuit 14, whether or not CLV control based on the wobble PLL clock should be performed, or whether or not data should be recorded on the optical disk 1 based on the wobble PLL clock.

When data is to be recorded on the optical disk 1, the RISC processing section 9 performs at least one of the processings, i.e., addition of an error correction code, interleaving, and scrambling, for data output from the system controller 10. The thus-processed data is output to the formatter 8 and stored in a FIFO memory (not shown) in the formatter 8.

The system controller 10 sets a recording target sector for the formatter 8. When reaching the recording target sector during reproduction of addresses, the formatter 8 modulates data in the FIFO memory, and while adding signals output from VFO pattern, SYNC, and the like to the modulated data, outputs the modulated data to the recording pulse generation circuit 7. The recording pulse generation circuit 7 processes the modulated data output from the formatter 8 to produce a pulse light beam for allowing a laser to actually emit light and outputs the pulse light beam to the laser driving circuit 16, which drives the laser to realize recording data on the optical disk 1.

Figure 10:
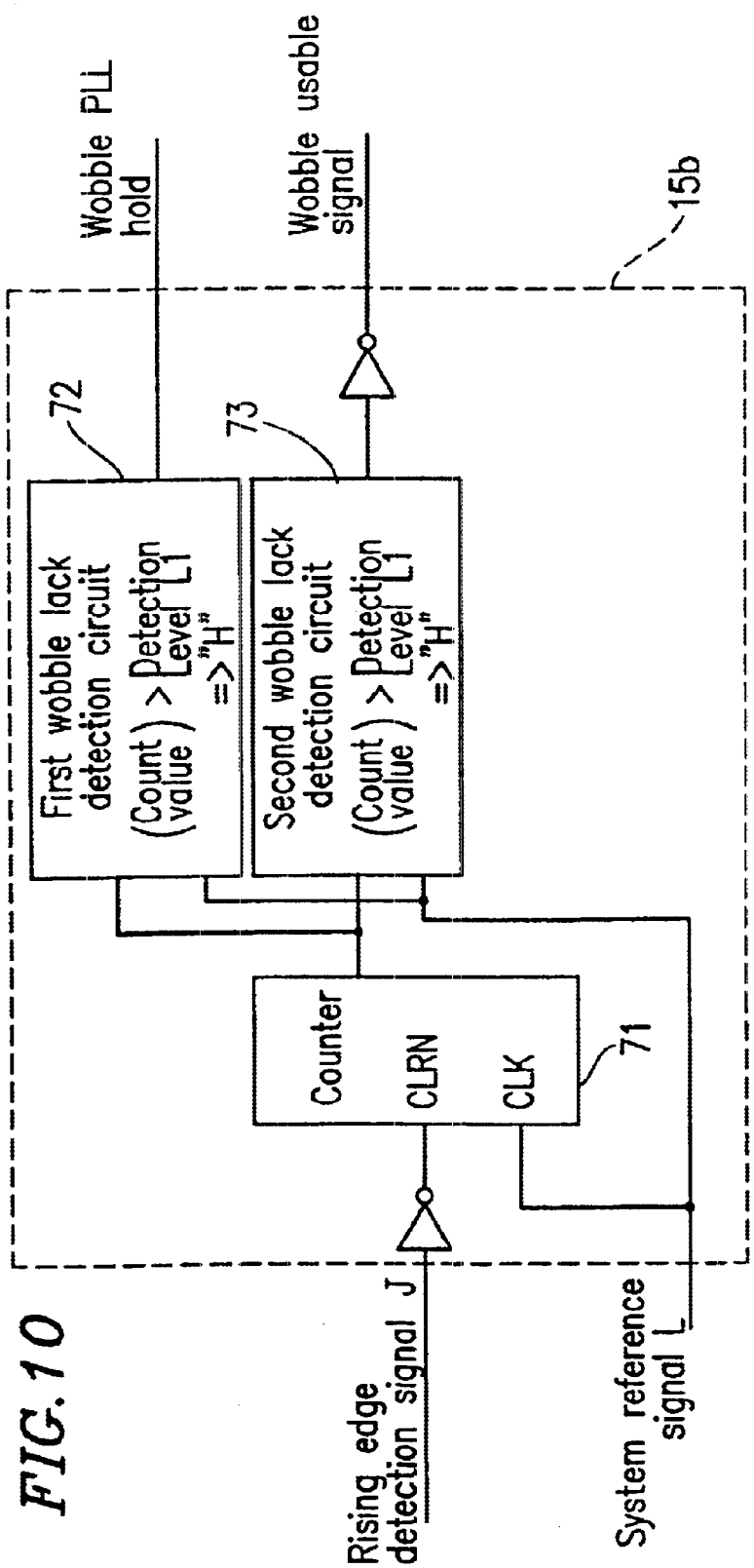
FIG. 10 is a view illustrating a wobble PLL detection circuit of Example 3 according to the present invention.

Hereinbelow, the detailed construction and operation of the wobble PLL detection circuit 15b will be described with reference to FIG. 10. FIG. 10 is a block diagram illustrating the wobble PLL detection circuit 15b.

The operation for detecting a failure of the wobble signal is the same as that described in Example 2. That is, if no light is reflected from the recording section of a sector due to a defect, dust, or the like, the signal digitized with a slice level having an offset continues a low level during the scanning of the portion where the defect or the like exists. This causes the rising edge detection signal output from the wobble signal failure detection circuit 17 to continue at a low level.

The wobble PLL detection circuit 15b includes a counter 71, a first wobble failure detection circuit 72, and a second wobble failure detection circuit 73.

The PLL detection circuit 15b outputs a wobble PLL hold signal to the wobble PLL circuit 14 when the output from the wobble digitizing circuit 13 is kept in a low level until the count of the output clock from the wobble PLL circuit 14 reaches or exceeds a predetermined value t1, or outputs the wobble usable 3 signal to the formatter 8 when it is kept in a low level until the count reaches or exceeds a value t2 wherein t2>t1. The wobble PLL circuit 14 holds a voltage of the signal input to the input terminal of the VCO when the wobble failure detection circuit 17 detects a failure of a signal, i.e., when the wobble PLL hold signal is received, keeping the clock at a fixed level.

The counter 71 counts the time period during which the rising edge detection signal J shown in FIG. 7 is in a low level. The first wobble failure detection circuit 72 generates a high-level wobble PLL hold signal when the count value exceeds a threshold L1. The threshold L1 is a value corresponding to the time period t1 during which the wobbling signal fails. When the count value exceeds a threshold L2, the second wobble failure detection circuit 73 generates a high-level signal, and the high-level signal is inverted by an inverter to generate a wobble usable 3 signal which accepts the state where the count value does not exceed the threshold. The threshold L2 is a value corresponding to the time period t2 during which the wobbling signal fails.

Figure 11:
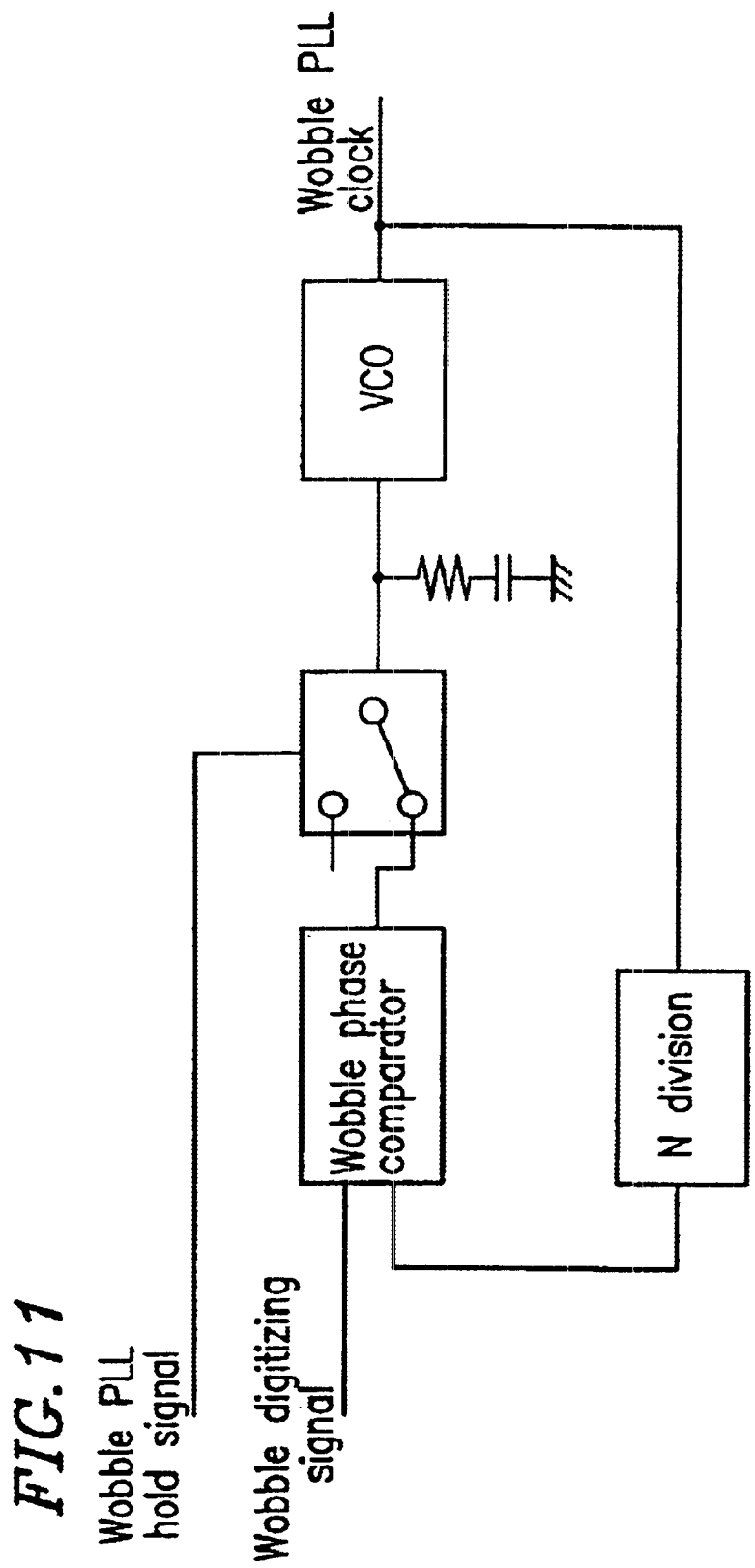
FIG. 11 is a view illustrating a wobble PLL circuit of Example 3 according to the present invention.

FIG. 11 is a block diagram illustrating an example of the wobble PLL circuit 14.

The input terminal of the VCO of the wobble PLL circuit 14 opens or forms a closed loop depending on the wobble PLL hold signal. If a closed loop is formed, the input voltage at the VCO is controlled based on the phase difference between the wobble digitizing signal and the N-divided wobble clock, so that the wobble digitizing signal and the N-divided wobble clock are phase-synchronized. More specifically, when a wobble failure time period t is less than t1, the wobble PLL circuit 14 forms a closed loop and performs the normal operation. If t1<t<t2, the wobble PLL circuit 14 holds an input voltage at the VCO during the time period from t1 to t. If t2<t, the wobble PLL circuit 14 holds an input voltage at the VCO during the time period from t1 to t2. At the moment when the wobble failure time period t reaches t2, the wobble signal is made unusable and, if data is being recorded, the recording is stopped or suspended.

In this example, the failure of the wobble signal is detected by digitizing the wobble signal by providing an offset to measure the length of a continuing low level of the signal. Alternatively, substantially the same effect as that described in this example can be obtained by measuring the length of a continuing time period during which the amplitude of the wide-band push-pull tracking error signal or the signal having just passed the bandpass filter 12 is equal to or less than a predetermined value.

Substantially the same effect as that described in this example can also be obtained by integrating the amplitude level of the wide-band push-pull tracking error signal or the signal having just passed the bandpass filter 12 and digitizing the integrated signal with a predetermined value.

Thus, an optical disk recording apparatus according to the present invention includes: first detection means for detecting a ID address cycle based on a timing of detection of an ID section of an optical disk; second detection means for detecting a wobble cycle based on a wobble clock; and determination means for determining the state of the wobble clock based on the ID address cycle and the wobble cycle. Accordingly, it is possible to determine whether or not the wobble clock is used for recording data depending on the state of the wobble clock. Also, the optical disk recording apparatus according to the present invention can stop or suspend recording of data on the optical disk if the state of the wobble clock is not good.

Another optical disk recording apparatus according to the present invention records data on an optical disk having tracks wobbled in the radial direction at a predetermined cycle, by phase-synchronizing the cycle of the wobbling and an N-divided wobble clock (wherein N is a rational number) so that the data recording is synchronous with the wobble clock. The optical disk recording apparatus is provided with detection means for detecting a failure of the wobble signal. In this optical disk recording apparatus according to the present invention, when a portion of the wobble signal has failed, data recording can be stopped or suspended.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk recording apparatus comprising:
   a first detection section for detecting a ID address cycle based on a timing of detection of an ID section of an optical disk;
   a second detection section for detecting a wobble cycle based on a wobble clock;
   a state determination section for determining a state of the wobble clock based on the ID address cycle and the wobble cycle, and
   a use determination section for detecting whether or not the wobble clock is usable based on the state of the wobble clock,
   wherein the state determination section generates a threshold window based on the ID address cycle and determines the state of the wobble clock by comparing the signal indicating the wobble cycle with the threshold window to determine whether or not a signal indicating the wobble cycle exists within the threshold window.

2. An optical disk recording apparatus according to claim 1, wherein the use determination section determines that the wobble clock is usable when the signal indicating the wobble cycle exists within the threshold window.

3. An optical disk recording apparatus according to claim 1, further comprising a recording section for recording data, and recording stop/suspension determination section for determining whether or not the recording should be stopped/suspended based on the state of the wobble clock.

4. An optical disk recording apparatus according to claim 3, wherein the stop/suspension determination section stops/suspends the recording when the signal indicating the wobble cycle exists outside the threshold window.

5. An optical disk recording apparatus comprising:
   a wobble reproduced signal processing section for reproducing a wobble signal to output a reproduced signal;

a digitizing section which does not output a digitized signal obtained by digitizing the reproduced signal when the reproduced signal has an amplitude less than a predetermined value or outputs the digitized signal when the reproduced signal has an amplitude equal to or more than the predetermined value;

a first failure determination section for outputting a first failure signal when the digitized signal is not output for a predetermined time period t1;

a second failure determination section for outputting a second failure signal when the digitized signal is not output for a predetermined time period t2;

a wobble phase difference detection section for outputting a phase difference signal between the digitized signal output from the digitizing section and an N-divided output clock output from a VCO;

a wobble PLL section for passing the phase difference signal output from the wobble phase difference detection section to the VCO via a low-pass filter;

a PLL blocking section for blocking the wobble PLL section from passing the phase difference signal to the VCO, depending on the first failure signal; and a wobble clock usable determination section for determining whether or not the wobble clock is usable depending on the second failure signal.

6. An optical disk recording apparatus comprising:

a wobble reproduced signal processing section for reproducing a wobble signal to output a reproduced signal;

a digitizing section which does not output a digitized signal obtained by digitizing the reproduced signal when the reproduced signal has an amplitude less than a predetermined value or outputs the digitized signal when the reproduced signal has an amplitude equal to or more than the predetermined value;

a first failure determination section for outputting a first failure signal when the digitized signal is not output for a predetermined time period t1;

a second failure determination section for outputting a second failure signal when the digitized signal is not output for a predetermined time period t2;

a wobble phase difference detection section for outputting a phase difference signal between the digitized signal output from the digitizing section and an N-divided output clock output from a VCO;

a wobble PLL section for passing the phase difference signal output from the wobble phase difference detection section to the VCO via a low-pass filter;

a PLL blocking section for blocking the wobble PLL section from passing the phase difference signal to the VCO, depending on the first failure signal; and a stop/suspension section for stopping/suspending recording of information on the optical disk during the recording depending on the second failure signal.

7. A method for recording data on an optical disk, comprising the steps of detecting a ID address cycle based on a timing of detection of an ID section of the optical disk;

detecting a wobble cycle based on a wobble clock;

determining a state of the wobble clock based on the ID address cycle and the wobble cycle; and determining whether or not the wobble clock is usable based on the state of the wobble clock, wherein the step of determining a state of the wobble clock generates a threshold window based on the ID address cycle and determines the state of the wobble clock by comparing the signal indicating the wobble cycle with the threshold window to determine whether or not a signal indicating the wobble cycle is within the threshold window.

8. A method for recording data on an optical disk according to claim 7, wherein the step of determining whether or not the wobble clock is usable determines that the wobble clock is usable when the signal indicating the wobble cycle is within the threshold window.

9. A method for recording data on an optical disk according to claim 7, further comprising the steps of:

recording data; and stopping/suspending the recording based on the state of the wobble clock.

10. A method for recording data on an optical disk according to claim 9, wherein the step of determining a state of the wobble clock generates a threshold window based on the ID address cycle and determines the state of the wobble clock depending on whether or not a signal indicating the wobble cycle is within the threshold window, and the step of stopping/suspending the recording stops/suspends the recording when the signal indicating the wobble cycle is outside the threshold window.

11. An optical disk recording apparatus for recording data on an optical disk having a track wobbled in a radial direction at a predetermined cycle in synchronization with a wobble clock by phase-synchronizing the cycle of the wobbling and an N-divided wobble clock (wherein N is a rational number), the optical disk recording apparatus comprising:

means for reproducing a wobble signal recorded on the optical disk;

means for generating a digitized signal obtained by digitizing the reproduced wobble signal when the reproduced wobble signal has an amplitude equal to or more than a predetermined value; and a failure determination section for determining whether or not a wobble signal has failed, wherein the failure determination section determines that the wobble signal has failed when the digitized signal is not output for a predetermined time period, the optical disk recording apparatus holds the wobble clock when the failure determination section determines that the wobble signal has failed for a predetermined time t1, and the optical disk recording apparatus makes the wobble clock unusable when the failure determination section determines that the wobble signal has failed for a predetermined time t2, wherein the predetermined time t2 is longer than the predetermined time t1.

12. An optical disk recording apparatus for recording data on an optical disk having a track wobbled in a radial direction at a predetermined cycle in synchronization with a wobble clock by phase-synchronizing the cycle of the wobbling and an N-divided wobble clock (wherein N is a rational number), the optical disk recording apparatus comprising:

means for reproducing a wobble signal recorded on the optical disk;

means for generating a digitized signal obtained by digitizing the reproduced wobble signal when the reproduced wobble signal has an amplitude equal to or more than a predetermined value; and a failure determination section for determining whether or not a wobble signal has failed, wherein the failure determination section determines that the wobble signal has failed when the digitized signal is not output for a predetermined time period, the optical disk recording apparatus holds the wobble clock when the failure determination section determines that the wobble signal has failed for a predetermined time t1, and the optical disk recording apparatus stops/suspends recording of information when the failure determination section determines that the wobble signal has failed for a predetermined time t2, wherein the predetermined time t2 is longer than the predetermined time t1.

13. An optical disk recording apparatus for recording data on an optical disk having a track wobbled in a radial direction at a predetermined cycle in synchronization with a wobble clock by phase-synchronizing the cycle of the wobbling and an N-divided wobble clock (wherein N is a rational number), the optical disk recording apparatus comprising:

means for reproducing a wobble signal recorded on the optical disk;

means for generating a digitized signal obtained by digitizing the reproduced wobble signal when the reproduced wobble signal has an amplitude equal to or more than a predetermined value; and a failure determination section for determining whether or not a wobble signal has failed, wherein the failure determination section determines that the wobble signal has failed when the digitized signal is not output for a predetermined time period, the optical disk recording apparatus holds the wobble clock when the failure determination section determines that the wobble signal has failed for a predetermined time t1, and the optical disk recording apparatus makes the wobble clock unusable when the failure determination section determines that the wobble signal has failed for a predetermined time t2, wherein the predetermined time t2 is equal to or longer than the predetermined time t1.

14. An optical disk recording apparatus for recording data on an optical disk having a track wobbled in a radial direction at a predetermined cycle in synchronization with a wobble clock by phase-synchronizing the cycle of the wobbling and an N-divided wobble clock (wherein N is a rational number), the optical disk recording apparatus comprising:

means for reproducing a wobble signal recorded on the optical disk;

means for generating a digitized signal obtained by digitizing the reproduced wobble signal when the reproduced wobble signal has an amplitude equal to or more than a predetermined value; and a failure determination section for determining whether or not a wobble signal has failed, wherein the failure determination section determines that the wobble signal has failed when the digitized signal is not output for a predetermined time period, the optical disk recording apparatus holds the wobble clock when the failure determination section determines that the wobble signal has failed for a predetermined time t1, and the optical disk recording apparatus stops/suspends recording of information when the failure determination section determines that the wobble signal has failed for a predetermined time t2, wherein the predetermined time t2 is equal to or longer than the predetermined time t1.

* * * * *